United States Patent
Naganathan et al.

(10) Patent No.: US 10,399,593 B2
(45) Date of Patent: Sep. 3, 2019

(54) PROGNOSTICATION OF REAL TIME OPERATING SYSTEM HEALTH

(71) Applicant: STEERING SOLUTIONS IP HOLDING CORPORATION, Saginaw, MI (US)

(72) Inventors: Vinod Shankar Naganathan, Saginaw, MI (US); Lonnie Newton, Saginaw, MI (US); Akilan Rathakrishnan, Cuddalore DT (IN)

(73) Assignee: Steering Solutions IP Holding Corporation, Saginaw, MI (US)

( * ) Notice: Subject to any disclaimer, the term of this patent is extended or adjusted under 35 U.S.C. 154(b) by 121 days.

(21) Appl. No.: 15/623,573

(22) Filed: Jun. 15, 2017

(65) Prior Publication Data

US 2017/0361870 A1 Dec. 21, 2017

Related U.S. Application Data

(60) Provisional application No. 62/351,513, filed on Jun. 17, 2016.

(51) Int. Cl.
| | |
|---|---|
| *G06F 11/00* | (2006.01) |
| *B62D 5/04* | (2006.01) |
| *G06F 9/48* | (2006.01) |
| *G06F 11/34* | (2006.01) |
| *G06F 11/30* | (2006.01) |

(52) U.S. Cl.
CPC ......... *B62D 5/0481* (2013.01); *G06F 9/4887* (2013.01); *G06F 11/3013* (2013.01); *G06F 11/3419* (2013.01)

(58) Field of Classification Search
CPC ... B62D 5/0481; G06F 9/4887; G06F 9/4843; G06F 9/485; G06F 9/4881; G06F 11/3013; G06F 11/3419; G06F 11/3003; G06F 11/3017; G06F 11/302; G06F 11/3024; G06F 2201/805
See application file for complete search history.

(56) References Cited

U.S. PATENT DOCUMENTS

| | | | | |
|---|---|---|---|---|
| 7,165,252 B1 * | 1/2007 | Xu | ......... | G06F 9/4887 |
| | | | | 718/100 |
| 2014/0309870 A1 * | 10/2014 | Ricci | ....... | H04W 4/21 |
| | | | | 701/36 |

FOREIGN PATENT DOCUMENTS

EP   2784676 A1 * 10/2014   ..........  G06F 11/0739

OTHER PUBLICATIONS

Terrier, François, Nikos S. Voros, and Udo Brockmeyer. "Specification, implementation, and validation of object-oriented embedded systems." In European Conference on Object-Oriented Programming, pp. 150-177. Springer, Berlin, Heidelberg, 2000. (Year: 2000).*

* cited by examiner

*Primary Examiner* — Anthony J Amoroso

(57) ABSTRACT

Embodiments are described for prognostication of real time operating system (RTOS) health. An example computer-implemented method includes monitoring, for a task from a plurality of tasks being executed by the RTOS, an execution time, an inter-arrival time, and a blocking time. The method further includes computing an RTOS state of health value based on the execution time, the inter-arrival time, and the blocking time of each task from the plurality of tasks. The method further includes, in response to the RTOS state of health value being less than a predetermined threshold, initiating performance of an error handling.

19 Claims, 7 Drawing Sheets

PROGNOSTICATION OF REAL TIME OPERATING SYSTEM HEALTH

CROSS-REFERENCES TO RELATED APPLICATIONS

This patent application claims priority to U.S. Provisional Patent Application Ser. No. 62/351,513, filed Jun. 17, 2016, which is incorporated herein by reference in its entirety.

BACKGROUND

The present application relates to computer technology, and more specifically, to real time operating systems (RTOS).

Typically, to determine the health of task being executed by an RTOS, the RTOS provides task timing that is specific for the task. By analyzing the task timing, the health of the task may be determined, and responsive action(s) may be taken. However, the analysis is typically performed using an offline tool, for example to identify the worst case timing behavior of the task over a period of time. The contemporary techniques, however, fail to provide a real time measurement and analysis of the task during actual use of the task, and fail to forecast a failure of task timing. Further, such task timing does not indicate an overall health of the RTOS itself.

Accordingly, it is desirable to determine health of the RTOS, particularly in applications such as steering wheel, such as an electric power steering, or other components of a vehicle, or any other cases where human health and safety is directly affected by failure or deterioration in operation of the RTOS.

SUMMARY

According to one or more embodiments, a computer-implemented method for prognostication of real time operating system (RTOS) health, the method includes monitoring, for a task from a plurality of tasks being executed by the RTOS, an execution time, an inter-arrival time, and a blocking time. The method further includes computing an RTOS state of health based on the execution time, the inter-arrival time, and the blocking time of each task from the plurality of tasks. The method further includes, in response to the RTOS state of health being less than a predetermined threshold, initiating performance of an error handling.

Further, embodiments are described for a system for prognostication of real time operating system (RTOS) health. The system includes a memory; and processor coupled with the memory. The processor operates the RTOS. Further, the processor monitors, for a task from a plurality of tasks being executed by the RTOS, an execution time, an inter-arrival time, and a blocking time. Further, the processor computes an RTOS state of health based on the execution time, the inter-arrival time, and the blocking time of each task from the plurality of tasks. Further, the processor, in response to the RTOS state of health being less than a predetermined threshold, initiate error handling.

Additionally, embodiments are described of a steering system that includes a controller that operates power assist functions of the steering system, the controller using a real time operating system (RTOS). The controller performs prognostication of health of the RTOS by: monitoring, for a task from a plurality of tasks being executed by the RTOS, an execution time, an inter-arrival time, and a blocking time. The controller further computes an RTOS state of health based on the execution time, the inter-arrival time, and the blocking time of each task from the plurality of tasks. The controller further, in response to the RTOS state of health being less than a predetermined threshold, initiates performance of an error handling.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

Referring now to the Figures, where the technical solutions will be described with reference to specific examples, without limiting same, the technical solutions facilitate prognosticating or forecasting a failure in an RTOS task during runtime.

An RTOS is an operating system (OS) intended to serve real-time processing of data as the data is received. Examples of RTOS include VXWORKS™, WINDOWS CE™, FREERTOS™, RTEMS™, among others. A key characteristic of an RTOS is level of consistency in scheduling and completing a task. As used herein a task may be an operating system operation, which may be invoked by an application executing on the RTOS, or an Interrupt Service Routines (ISR), or the like. The execution time is the time for a single execution of the task.

Typically, the task has an associated deadline within which the task has to complete. A deadline miss is a scenario where the execution of the task does not complete before the task's deadline. In one or more examples, the deadline is an immediate next activation of the task. Alternatively, or in addition, the deadline includes a duration of a certain number of activations of the task. In one or more examples, the task may miss the deadline because of a failure of the task at runtime. In one or more examples, the task may miss the deadline because of a cascading effect caused by a failure of one or more other tasks. Hence, the deadline miss is an indication of the earliest point in time that a timing fault is detected. In a hard RTOS, such as one used in an electrical power steering system (EPS), task timing and task deadline play a critical role. The timing may get swayed away due to an erroneous behavior in any of the functionalities of the RTOS, and/or due to delays due to undetermined/unknown program flow.

Figure 1:
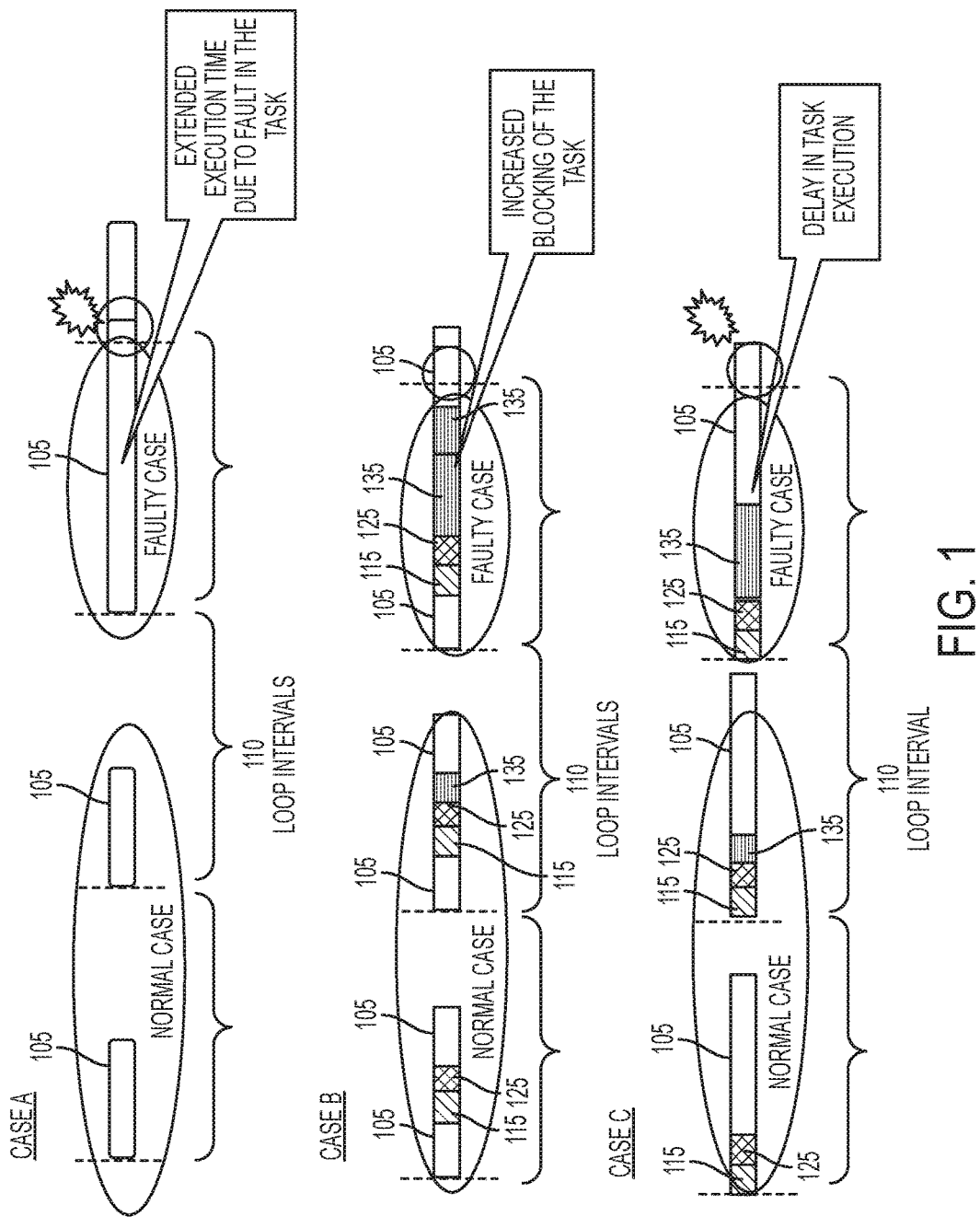
FIG. 1 illustrates examples of deadline miss scenarios in a real time operating system (RTOS) according to one or more embodiments.

FIG. 1 illustrates examples of deadline miss scenarios in an RTOS. For simplicity of explanation, a maximum allowed task activation of 1 is considered, that is only one instance of a task is active at any instant. However, it is understood that the technical solutions described herein are applicable for RTOS, which facilitate multiple task activations. FIG. 1 depicts three example scenarios in which a deadline miss can occur in an RTOS. In the examples, consider that a task 105 is being executed or activated repeatedly, and that the task 105 has a prescribed loop interval 110. That is each instance or execution of the task 105 has to complete within the loop interval 110, after which a next execution of the task 105 is initiated. If the task 105 does not complete within the loop interval 110, the task 105 misses the deadline.

In FIG. 1, Case A, for example, depicts a scenario where a condition, such as a failure, in the task 105 during the runtime causes an increase in the execution time of the task 105, in turn leading to a deadline miss. For example, the task 105 executes within the loop interval 110 in the first two iterations depicted, however, the runtime failure during the third execution causes the task 105 to complete after the loop interval 110 completes, leading to the deadline miss.

In Case B, for example, an increased blocking of the task 105 causes a delay in the task 105 completion, and in turn a deadline miss. The task 105 is blocked by other tasks, such as tasks 115, 125, and 135, which have a higher priority than the task 105. The task 105 is blocked when after the task 105 has begun execution, the one or more higher priority tasks are initiated, blocking or preempting the execution of the task 105 until the higher priority tasks are completed. After completion of the higher priority tasks, the task 105 resumes its execution. As illustrated in the example scenario, the task 105 completes within the prescribed loop interval 110 in the first two executions despite being blocked by the higher priority tasks 115, 125, and 135. However, in the third execution, the execution of the higher priority tasks prevents the task 105 from completing within the loop interval 110, causing a deadline miss for the task 105.

Further, in Case C, for example, a delay in the activation of the task 105 because of blocking by one or more other tasks 115, 125, and 135, leads to a deadline miss of the task 105. In this case, the higher priority tasks 115, 125, and 135 are activated before the task 105 is activated, unlike after the start of the task 105 in case B. FIG. 1 depicts that the task 105 completes within the prescribed loop interval 110 despite the delayed start in the first two executions. However, in the third execution, the delayed start caused by the higher priority tasks 115, 125, and 135 being activated before causes a deadline miss by the task 105.

It is understood that the above cases are examples and that additional examples are possible. Further, it is understood that although the above examples describe an interplay of four tasks, in other examples, a different number of tasks may cause a deadline miss of a task for the reasons described above.

The technical solutions described herein facilitate forecasting a possibility of a deadline miss by monitoring specific parameters during runtime of the RTOS. For example, the execution time of the task in the RTOS facilitates predicting a deadline miss, such as in Case A. In one or more examples, a predetermined threshold for a maximum execution time prognosis may be specified, beyond which a deadline miss is predicted. For example, the execution time may be monitored as execution time $(T_{exec})$= (Task End Time–Task Start Time)–Blocking Time.

Alternatively or in addition, the technical solutions described herein facilitate monitoring the blocking time that the task suffers because of preemption or waiting for shared resources, such as in Case B. For example, the blocking time represents time interval for which a higher priority task or ISR blocks the task. In one or more examples, a predetermined threshold for maximum blocking time prognosis may be specified, beyond which a deadline miss is predicted. For example, the blocking time may be determined as task blocking time $(T_{block})$=(Task End Time–Task Start Time)–$T_{exec}$.

Alternatively or in addition, the technical solutions described herein facilitate monitoring an inter-arrival time of a task in the RTOS, such as for Case C. The inter-arrival time represents a time interval between two execution instances of the same task. In one or more examples, a predetermined threshold for maximum inter-arrival time prognosis may be specified, above which there a deadline miss is predicted. For example, the inter-arrival time may be determined as task inter-arrival time $(T_{inter})$=Task Start Time New–Task Start Time Old.

Alternatively or in addition, the technical solutions described herein facilitate monitoring a task active time. The task active time is determined as a sum of the blocking time, execution time, and the inter-arrival deviation time. The task active time represents the time for which the task is active in the RTOS.

Figure 2:
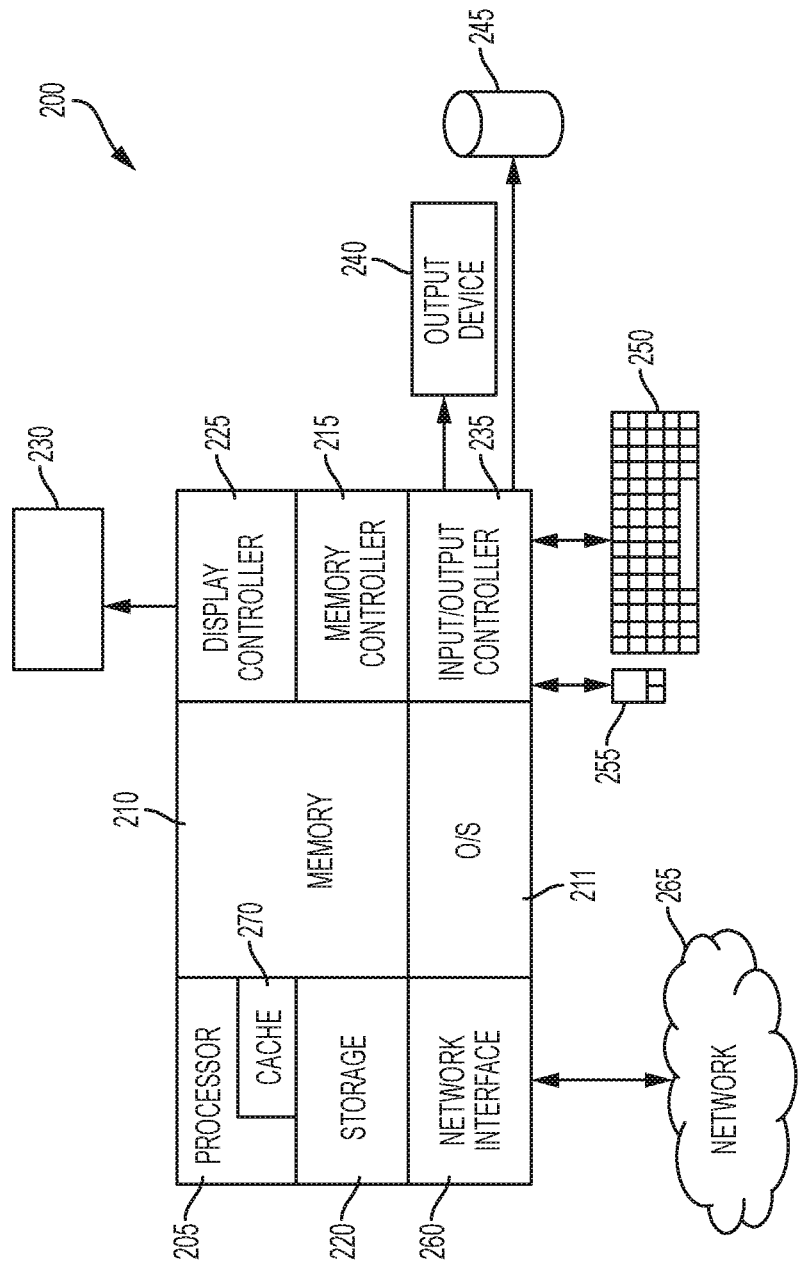
FIG. 2 illustrates example components of a system that executes the RTOS according to one or more embodiments.

FIG. 2 illustrates example components of a system 200 that executes the RTOS. The system 200 may be a communication apparatus, such as a computer. In one or more examples, the system 200 may be an ECU of a vehicle, such as an ECU of the EPS of the vehicle. The system 200 may be part of a power steering system of vehicle, such as an automobile, boat, or the like. The system 200 may be part of any other product such as a television, a washing machine, a microwave oven, a vehicle infotainment system, or any other product. The system 200 may operate as an embedded processing system that executes the RTOS in the one or more products. The system 200 includes hardware, such as electronic circuitry.

For example, the system 200 includes, among other components, a processor 205, memory 210 coupled to a memory controller 215, and one or more input devices 245 and/or output devices 240, such as peripheral or control devices, that are communicatively coupled via a local I/O controller 235. These devices 240 and 245 may include, for example, battery sensors, position sensors (altimeter, accelerometer, GPS), indicator/identification lights and the like. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the system 200, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on.).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable RTOS 211. The RTOS 211 controls the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods of this disclosure.

The system 200 may further include a display controller 225 coupled to a user interface or display 230. In some embodiments, the display 230 may be an LCD screen. In other embodiments, the display 230 may include a plurality of LED status lights. In some embodiments, the system 200 may further include a network interface 260 for coupling to a network 165. The network 165 may be an IP-based network for communication between the system 200 and an external server, client and the like via a broadband connection. In an embodiment, the network 165 may be a satellite network. The network 165 transmits and receives data between the system 200 and external systems. In some embodiments, the network 165 may be a managed IP network administered by a service provider. The network 165 may be implemented in a wireless fashion, for example, using wireless protocols and technologies, such as WiFi, WiMax, satellite, or any other. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet, a Controller Area Network (CAN) or other types of vehicle bus networks, or other suitable network system and may include equipment for receiving and transmitting signals.

In one or more examples, the system 200 prognosticates a deadline miss by monitoring and analyzing the execution time, inter-arrival time, and blocking time, for each task in the RTOS 211. For example, the system 200 prognosticates the deadline miss by evaluating a prognosis margin and performing a runtime prognosis.

Figure 3:
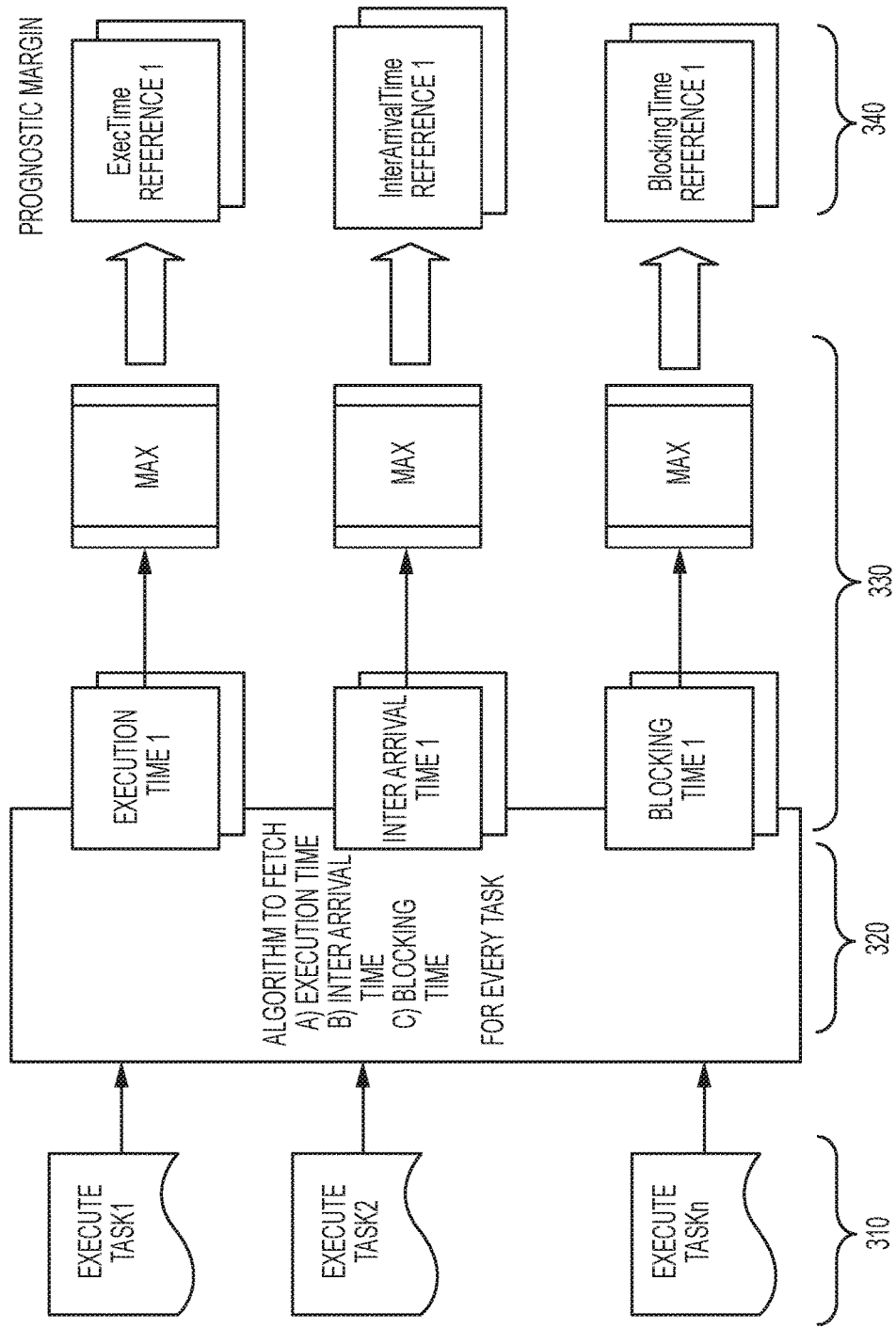
FIG. 3 illustrates a flowchart of an example method for evaluating prognosis margin values for predicting an RTOS failure according to one or more embodiments.

FIG. 3 illustrates a flowchart of an example method for evaluating the prognosis margin values (or model values) for predicting an RTOS failure. Evaluating the prognosis margin includes determining the model values for the execution time, the inter-arrival time, and the blocking time for each individual task that is to be executed on the RTOS 211. The system 200 uses the model values for performing the runtime prognosis subsequently by reconfiguring base values with the model values.

As illustrated in FIG. 3, evaluating the prognosis margin includes executing the code on the target system 200, as shown at 310. The target system 200 has a predetermined number of tasks that are to be executed on the RTOS 211. Each task from the predetermined list of tasks is executed, for example using one or more predetermined sequences of tasks. In one or more examples, the sequences of tasks include different combinations of the predetermined tasks.

During the execution of the sequences of tasks, the technical solutions herein execute a background process that monitors the RTOS 211 to measure the execution time, the blocking time, and the inter-arrival time for each individual task executed on the RTOS 211, as shown at 320. Thus, after all the sequences of tasks has completed execution, the collected data includes multiple observations of the execution time, the blocking time, and the inter-arrival time for each individual task.

In one or more examples, ratios of the observed values are computed with reference to the loop interval, converting the reference of the individual parameter with respect to the loop interval associated with a task.

For example, the system 200 computes a percentage of execution time as the amount of time for which the task is in the running state within 1 looptime of the task, for example by $(T_{Exec}/LoopTime) \times 100$. Further, the system 200 computes the percentage of blocking time as the amount of time for which the task is blocked within 1 looptime of the task, for example by $(T_{block}/LoopTime) \times 100$. The system 200 further computes the percentage inter-arrival time as the ratio of the amount of time after which the task is brought into running state (from ready state) and 1 looptime of the task, for example expressed by, $((T_{inter}-Looptime)/LoopTime) \times 100$. The system 200 further computes a percentage of task active time as the sum of the percentages of the blocking time, the execution time, and the inter-arrival time. The active time represents the time for which the task is active.

The method for determining the prognosis margin further includes evaluating a maximum execution time, a maximum blocking time, and a maximum inter-arrival time for each task from the predetermined list of tasks from the available samples of collected data, as shown at 330.

Further, the method includes determining the model/reference values for the execution time, the blocking time, and the inter-arrival time for each of the predetermined tasks, as shown at 340. In one or more examples, the maximum times are used as the reference values. Alternatively, or in addition, the reference values for one or more of the parameters are adjusted based on offline fine-tuning.

For example, the computed values are analyzed offline and task timings are fine-tuned according to specific metrics. For example, consider a scenario for which an expected maximum CPU utilization is 80% out of 7 tasks of potentially similar timing profile, which implies a maximum execution time per task: 80/7=11.5%. Accordingly, the system 200 may identify the tasks which have an execution time percentage >=11.5%. The execution time percentage of the task may be targeted to be brought down by a responsive action, such as one or more of code optimization, functionality optimization, moving functionality to a task with a higher looptime.

Alternatively or in addition, the system 200 may identify tasks which have task active time above a predetermined threshold, for example 70%. The task active time value may be targeted to be reduced by one or more responsive actions such as, analyzing the percentages of the execution time, the blocking time, and the inter-arrival time, to identify which of these influence the active time value. Alternatively or in addition, the execution time is reduced by the above mentioned responsive actions. Alternatively or in addition, the blocking time and inter-Arrival time may be reduced by increasing the priority of the task.

In one or more examples, after performing the responsive actions and after performing multiple iterations of the above steps, the final execution time, blocking time, and the inter-arrival time corresponding to the best possible derived values are provided as the reference values for configuring or calibrating the prognosis. Once the reference values are set, the system 200 can perform a runtime prognosis during operation.

Figure 4:
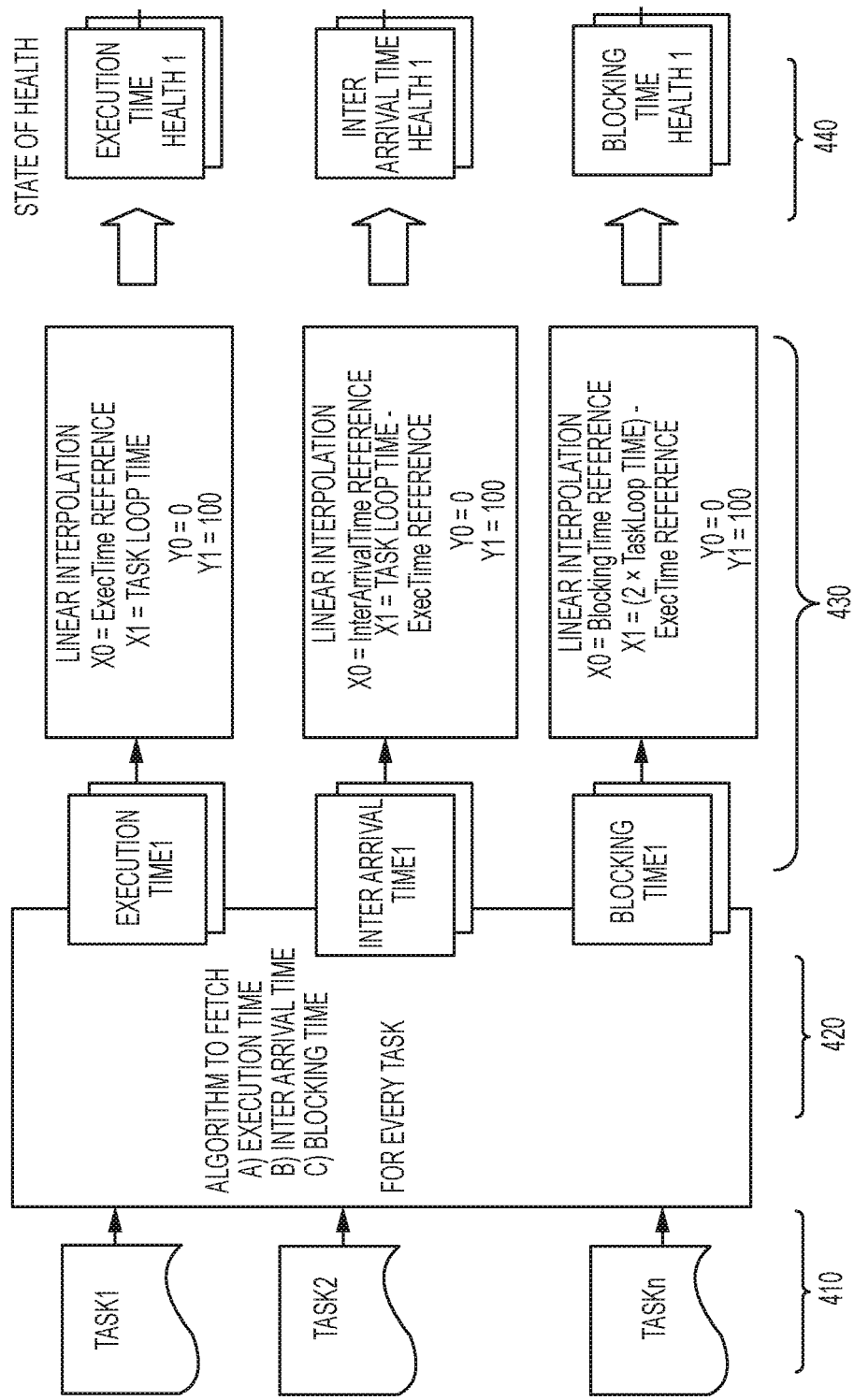
FIG. 4 illustrates a flowchart of an example method for performing a runtime prognosis of tasks being executed by an RTOS according to one or more embodiments.

FIG. 4 illustrates a flowchart of an example method for performing a runtime prognosis of the tasks being executed by the RTOS 211. The system 200 executes the health monitoring in the background to monitor the execution of the tasks on the RTOS 211, as shown at 410. The system 200, measures the execution time, the blocking time, and the inter-arrival time for each task that is being executed, as shown at 420. The system 200 further converts the measured parameters into corresponding state of health values by scaling them based on the configured reference values, as shown at 430. The state of health value(s) represents a whether the RTOS 211 is predicted to have a failure or an error. In one or more examples, the state of health value(s) is converted into a state of health indication for a user. In one or more examples, the state of health value is a health coefficient. For example, the indication may include a user-interface color, an icon, or the like. For example, the state of health value within a predefined range may be associated with a corresponding color (e.g. red, yellow, green, etc.), and/or a corresponding icon (warning, stop symbol, etc.), where the color and/or icon depict a state of health of the RTOS 211.

For example, the system 200 assigns a state of health value to each of the monitored parameters, such as the execution time, the blocking time, and the inter-arrival time. In one or more examples, the state of health value is a numeric value between 0 and 100, each coefficient value indicating a state of the health of the RTOS 211 for that parameter. For example, the state of health value of 0 indicates Bad or Poor RTOS health and the state of health value of 100 indicates a Good RTOS health. It is understood that a different range of the state of health value may be used in other examples, and that different values to indicate the state of health of the RTOS may be used in other examples.

The system 200 computes a state of health value for a task based on the corresponding reference value and the measured parameter value during the runtime. For example, for a task-1, and for each monitored parameter of the task-1, the system 200 uses the corresponding reference values. For example, in case of the execution time, the system 200 uses the reference execution time of task-1 that is determined as described herein (reference value in FIG. 3), and the measured execution time of task-1 during runtime to determine the execution time state of health value for the task-1. Similarly, the system 200 computes the execution time state of health values for each respective task from the tasks that the RTOS 211 is executing. Further, the system 200 computes the blocking time state of health values and the inter-arrival time state of health values for each of the tasks.

Figure 5:
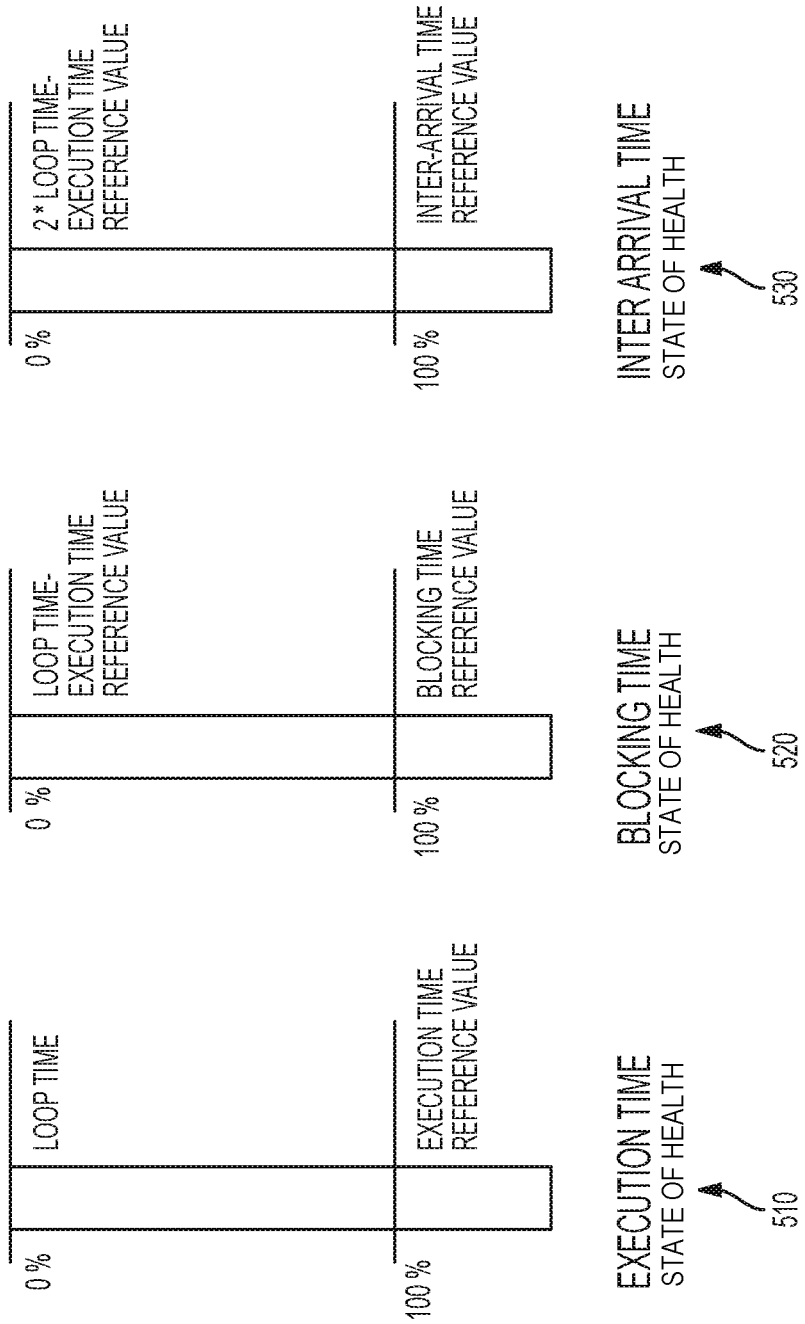
FIG. 5 depicts an example set of scales that a system uses to determine state of health of an RTOS according to one or more embodiments.

FIG. 5 depicts an example set of scales that the system 200 uses to determine the state of health of an RTOS, for example for determining the state of health values for the execution time, the blocking time, and the inter-arrival time. The Max configured values that are indicated in FIG. 5 are based on the reference values computed by the system 200 by implementing the method for evaluating the prognosis margin (FIG. 3). The system 200 computes the values corresponding to minimum configured values based on the loop time and the configured reference values. In one or more examples, the system 200 maps the state of health values to the range within the minimum and the maximum configured values.

For example, for the execution time state of health value, the system 200 uses the loop time as a minimum, and the configured maximum execution time as the maximum. For a task that is executing, a corresponding measured execution time is converted to an execution time state of health value based on the above scale. Accordingly, if a task takes an entire looptime to complete the operation, the task may be assigned an execution time state of health value of 0. Alternatively, if the task completes operation within the maximum configured value, the task is assigned an execution time state of health value of 100. An execution time between the looptime and the reference value is converted according to the scale. For example, an execution time state of health for task T can be expressed as $H_{Exec}(T)=((Min_{Exec}(T)-Time_{Exec}(T))/(Min_{Exec}(T)-Max_{Exec}(T)))\times 100$, where $Min_{Exec}(T)$ is the minimum of the scale, here set to the looptime for the task T, $Time_{Exec}(T)$ is measured execution time of the task T, and $Max_{Exec}(T)$ is the execution time reference value for the task T.

In addition, for the blocking time state of health value, the system 200 uses (Loop time−Execution time reference value) as the minimum and blocking time reference value as the maximum. For a task that is executing, a corresponding measured blocking time execution time is converted to a blocking time state of health value based on the above scale in a manner similar to the computation for the execution time state of health value above. For example, $H_{Blk}(T)=(Min_{Blk}(T)-Time_{Blk}(T))/(Min_{Blk}(T)-Max_{Blk}(T))$.

In addition, for the inter-arrival time state of health value, the system 200 uses (2*Loop time−Execution time reference value) as the minimum and inter-arrival time reference value as the maximum. For a task that is executing, a corresponding measured inter-arrival time execution time is converted to an inter-arrival time state of health value based on the above scale in a manner similar to the computation for the execution time state of health value above. For example, $H_{IA}(T)=(Min_{IA}(T)-Time_{IA}(T))/(Min_{IA}(T)-Max_{IA}(T))$.

It should be noted that in other examples, the scales are configured differently than the computations described herein.

In one or more examples, if any of the state of health values drops below the maximum state of health value (for example, 100), the system 200 may deem the drop as an indication of degradation in performance of the RTOS 211. Further, in one or more examples, the state of health values for the different parameters of the various tasks are consolidated into a single RTOS state of health value.

Figure 6:
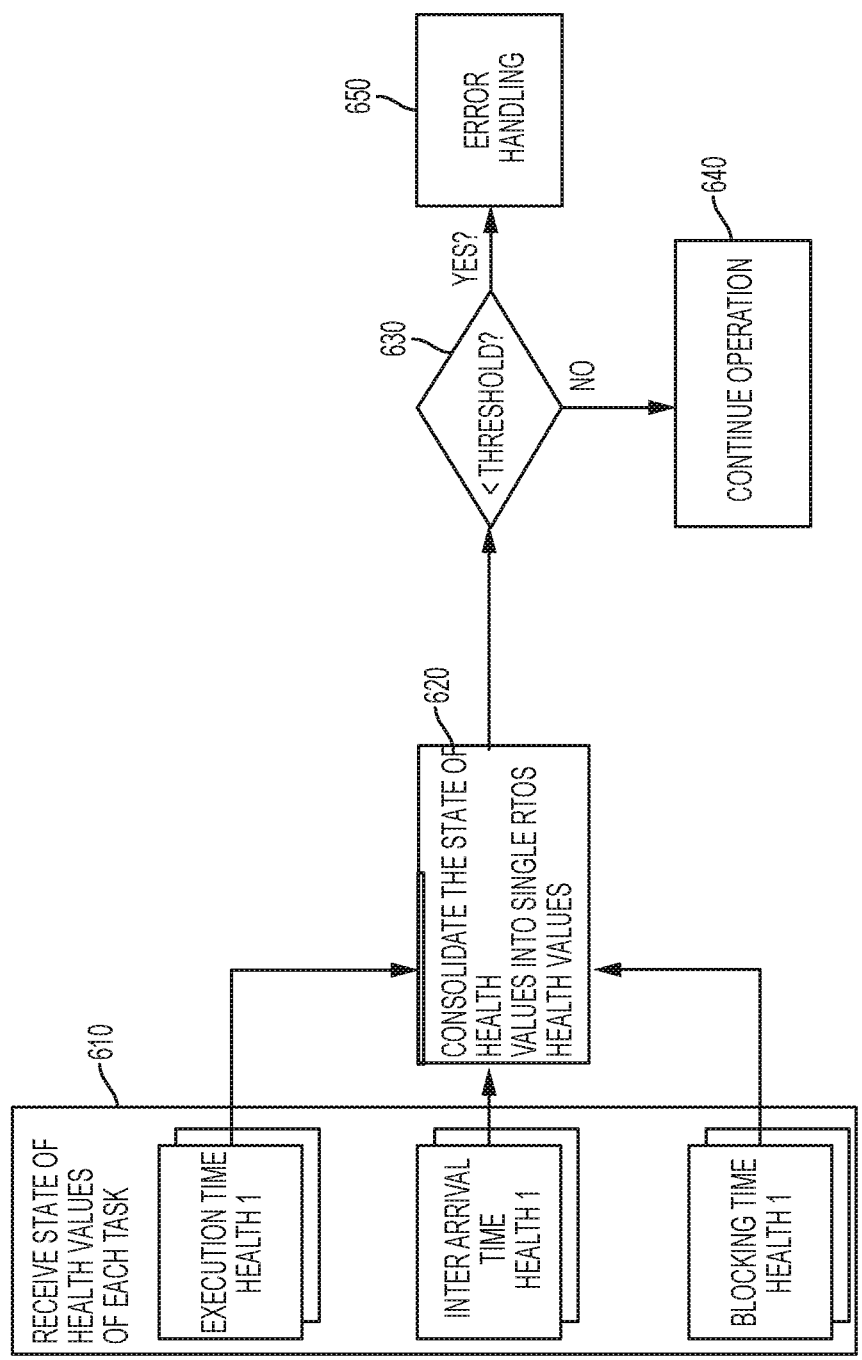
FIG. 6 illustrates an example flowchart of a method for prognosticating RTOS health based on the state of health values for individual tasks that the RTOS is executing according to one or more embodiments.

FIG. 6 illustrates an example flowchart of a method for prognosticating the RTOS health based on the state of health values for the individual tasks that the RTOS 211 is executing. The system receives the state of health values for each parameter for each task being executed, as shown at 610. That is, for each task the system 200 has a triplet of an execution time state of health value, a blocking time state of health value, and an inter-arrival time state of health value.

In one or more examples, the system 200 may determine a single consolidated RTOS state of health value based on the multiple state of health values for the multiple tasks, as shown at 620. For example, the single RTOS state of health value is represented as a minimum value of all the state of health values of the individual tasks. For example, in case of 5 tasks, the system 200 would have 15 values (3 state of health values for each of the 5 tasks). The single RTOS state of health value is the minimum of the 15 state of health values in this case.

Alternatively, in one or more examples, the consolidated RTOS state of health value is a triplet of the minimum values of the execution time, the blocking time, and the inter-arrival time. Thus, in the above example with 5 tasks, the single RTOS state of health is a $<Min(H_{Exec}), Min(H_{Blk}), Min(H_{IA})>$.

Alternatively, in one or more examples, the consolidated RTOS state of health value is a set of minimum values for each task. For example, in the above case with 5 tasks, the RTOS state of health value includes five values {Min(T1), Min(T2), Min (T3), Min(T4), Min(T5)}, where Min(Tx) is the minimum of the three state of health values for the task Tx. For example, $Min(Tx)=Min(H_{Exec}(T), H_{Blk}(T), H_{IA}(T))$.

Further, the system 200 compares the consolidated RTOS state of health value with a predetermined threshold, as shown at 640. If the consolidated RTOS state of health value is above the predetermined threshold, then the system 200 continues to operate as programmed, as shown at 640. If the consolidated RTOS state of health value is below the predetermined threshold, then the system 200 initiates a responsive error handling, as shown at 650. In one or more examples, the predetermined threshold is a triplet including threshold values for the three state of health values. Alternatively, in one or more examples, the predetermined threshold is a set of minimum values for each predetermined task executable on the RTOS 211.

The above described technical solutions facilitate an OS health prognosis that can predict an RTOS failure. In one or more examples, the technical solutions compute state of health values for individual tasks of the RTOS, for example on a 0 to 100 scale. In one or more examples, if any of the computed state of health values fall below the maximum value, say 100, the technical solutions trigger an indication of degradation in the OS performance. Alternatively, or in addition, in one or more examples, a consolidated RTOS state of health value is derived as the minimum value among all the state of health values. A predetermined threshold value is determined, and if the RTOS state of health value reaches below the threshold, an error handling is performed.

The error handling depends on the application in which the RTOS is being used. For example, the RTOS may be operating a controller of a power steering system of a vehicle. The controller manages the power assist provided to a steering wheel of the power steering system. In such a scenario, a failure of the RTOS can render the power steering system unable to provide power assist causing the vehicle to operate in an undesirable manner. Predicting the RTOS failure and triggering the corresponding error handling can prevent such undesirable effects on the vehicle and/or an operator and/or passengers of the vehicle. In one or more examples, the error handling includes outputting a diagnostic code indicative of the RTOS failure. Alternatively, or in addition, the error handling includes a visual indication, such as a warning symbol or light being displayed. For example, in a vehicle, the warning symbol is displayed on a dashboard of the vehicle. Alternatively, or in addition, the error handling includes an audible warning, such as a beep or any other sound indicative of the predicted RTOS failure.

Alternatively, or in addition, the error handling includes resetting one or more non-critical components of the RTOS 211. In one or more examples, a predetermined list of tasks or components of the RTOS 211 is accessed, and those components are turned off for a predetermined duration, and turned back on. Alternatively, or in addition, the RTOS 211 is completely reset.

Further yet, in one or more examples, in case the RTOS 211 is used in a vehicle, the error handling in response to the predicted RTOS failure includes causing the vehicle to operate in a degraded mode. For example, a velocity of the vehicle may be limited to a predetermined maximum value.

Figure 7:
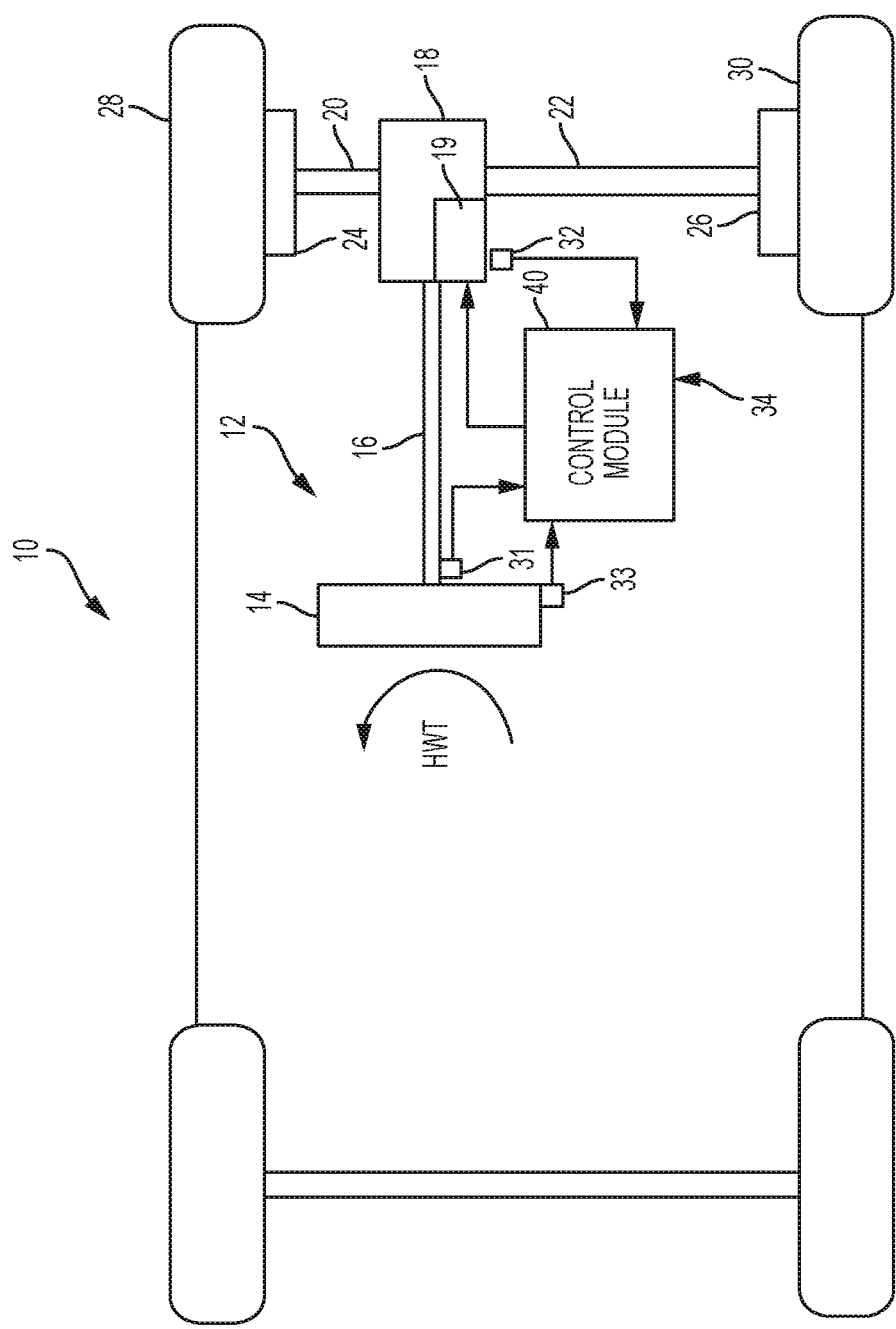
FIG. 7 depicts an exemplary embodiment of a vehicle including a steering system according to one or more embodiments.

For example, referring now to the FIG. 7 depicts an exemplary embodiment of a vehicle 10 including a steering system 12. In various embodiments, the steering system 12 includes a handwheel 14 coupled to a steering shaft system 16 which includes steering column, intermediate shaft, & the necessary joints. In one exemplary embodiment, the steering system 12 is an EPS system that further includes a steering assist unit 18 that couples to the steering shaft system 16 of the steering system 12, and to tie rods 20, 22 of the vehicle 10. Alternatively, steering assist unit 18 may be coupling the upper portion of the steering shaft system 16 with the lower portion of that system. The steering assist unit 18 includes, for example, a rack and pinion steering mechanism (not shown) that may be coupled through the steering shaft system 16 to a steering actuator motor 19 and gearing. During operation, as a vehicle operator turns the handwheel 14, the steering actuator motor 19 provides the assistance to move the tie rods 20, 22 that in turn moves steering knuckles 24, 26, respectively, coupled to roadway wheels 28, 30, respectively of the vehicle 10.

As shown in FIG. 7, the vehicle 10 further includes various sensors 31, 32, 33 that detect and measure observable conditions of the steering system 12 and/or of the vehicle 10. The sensors 31, 32, 33 generate sensor signals based on the observable conditions. In one example, the sensor 31 is a torque sensor that senses an input driver handwheel torque (HWT) applied to the handwheel 14 by the operator of the vehicle 10. The torque sensor generates a driver torque signal based thereon. In another example, the sensor 32 is a motor angle and speed sensor that senses a rotational angle as well as a rotational speed of the steering actuator motor 19. In yet another example, the sensor 32 is a handwheel position sensor that senses a position of the handwheel 14. The sensor 33 generates a handwheel position signal based thereon.

A control module 40 receives the one or more sensor signals input from sensors 31, 32, 33, and may receive other inputs, such as a vehicle speed signal 34. The control module 40 generates a command signal to control the steering actuator motor 19 of the steering system 12 based on one or more of the inputs and further based on the steering control systems and methods of the present disclosure. The steering control systems and methods of the present disclosure apply signal conditioning as a control signal that can be used to control aspects of the steering system 12 through the steering assist unit 18.

In one or more examples, the control module 40 is an ECU operated by an RTOS, such as the system 200 (FIG. 2) with RTOS 211. It should be noted that while a steering system 12 operated by an ECU is depicted here, the technical solutions described herein are applicable in various other settings, such as in other ECUs that operate other components of the vehicle 10, for example, engine, exhaust system, tire pressure monitor system, infotainment system, among others. Further yet, the applicability of the technical solutions is not limited to a vehicle, rather to any other field where an RTOS is used, such as medical devices, industrial machines, and the like.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession, in fact, may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

Having thus described the invention, it is claimed:

1. A method for prognostication of real time operating system (RTOS) health, the method comprising:
monitoring, for a task from a plurality of tasks being executed by the RTOS, an execution time, an inter-arrival time, and a blocking time;
computing an RTOS state of health value based on the execution time, the inter-arrival time, and the blocking time of each task from the plurality of tasks, computing the RTOS state of health comprising:
for each specific task from the plurality of tasks being executed by the RTOS:
computing an execution time state of health value based on a ratio of the execution time for the specific task and an execution time reference value for the specific task;
computing an inter-arrival time state of health value based on a ratio of the inter-arrival time for the specific task and an inter-arrival time reference value for the specific task; and
computing a blocking time state of health value based on a ratio of the blocking time for the specific task and a blocking time reference value for the specific task; and
in response to the RTOS state of health being less than a predetermined threshold, initiating performance of an error handling.

2. The method of claim 1, wherein the execution time of the task is a duration for a single execution of the task.

3. The method of claim 1, wherein the blocking time of the task is a duration for which execution of the task is blocked by a higher priority task.

4. The method of claim 1, wherein the inter-arrival time of the task is a duration for which activation of the task is blocked by a higher priority task.

5. The method of claim 1, wherein computing the RTOS state of health further comprises:
determining a minimum value from the execution time state of health value, inter-arrival time state of health value, and blocking time state of health value of the plurality of tasks being executed by the RTOS.

6. The method of claim 1, wherein the predetermined threshold is configurable.

7. The method of claim 1, wherein the execution time reference value, the inter-arrival time reference value, and the blocking time reference value are determined automatically by executing the plurality of tasks on the RTOS and monitoring the execution time, the inter-arrival time, and the blocking time of the respective tasks.

8. A system for prognostication of real time operating system (RTOS) health, the system comprising:
a memory; and
processor coupled with the memory, the processor configured to operate the RTOS and further to:
monitor, for a task from a plurality of tasks being executed by the RTOS, an execution time, an inter-arrival time, and a blocking time;
compute an RTOS state of health value based on the execution time, the inter-arrival time, and the blocking time of each task from the plurality of tasks, computing the RTOS state of health comprising:
for each specific task from the plurality of tasks being executed by the RTOS:
computing an execution time state of health value based on a ratio of the execution time for the specific task and an execution time reference value for the specific task;
computing an inter-arrival time state of health value based on a ratio of the inter-arrival time for the specific task and an inter-arrival time reference value for the specific task; and
computing a blocking time state of health value based on a ratio of the blocking time for the specific task and a blocking time reference value for the specific task; and
in response to the RTOS state of health value being less than a predetermined threshold, initiate error handling.

9. The system of claim 8, wherein the execution time of the task is a duration for a single execution of the task.

10. The system of claim 8, wherein the blocking time of the task is a duration for which execution of the task is blocked by a higher priority task.

11. The system of claim 8, wherein the inter-arrival time of the task is a duration for which activation of the task is delayed by a higher priority task.

12. The system of claim 8, wherein computation of the RTOS state of health value further comprises:
determination of a minimum value from the execution time state of health value, inter-arrival time state of health value, and blocking time state of health value of the plurality of tasks being executed by the RTOS.

13. The system of claim 8, wherein the predetermined threshold is configurable.

14. The system of claim 8, wherein the execution time reference value, the inter-arrival time reference value, and the blocking time reference value are determined automatically by executing the plurality of tasks on the RTOS and monitoring the execution time, the inter-arrival time, and the blocking time of the respective tasks.

15. A steering system comprising:
a controller that operates power assist functions of the steering system, the controller using a real time operating system (RTOS), the controller further configured to perform prognostication of health of the RTOS by:
monitoring, for a task from a plurality of tasks being executed by the RTOS, an execution time, an inter-arrival time, and a blocking time;
computing an RTOS state of health value based on the execution time, the inter-arrival time, and the blocking time of each task from the plurality of tasks, computing the RTOS state of health comprising:
for each specific task from the plurality of tasks being executed by the RTOS:
computing an execution time state of health value based on a ratio of the execution time for the specific task and an execution time reference value for the specific task;
computing an inter-arrival time state of health value based on a ratio of the inter-arrival time for the specific task and an inter-arrival time reference value for the specific task; and
computing a blocking time state of health value based on a ratio of the blocking time for the specific task and a blocking time reference value for the specific task; and
in response to the RTOS state of health value being less than a predetermined threshold, initiating performance of an error handling.

16. The steering system of claim 15, wherein:
the execution time of the task is a duration for a single execution of the task;
the blocking time of the task is a duration for which execution of the task is blocked by one or more higher priority tasks; and
the inter-arrival time of the task is a duration for which activation of the task is blocked by one or more higher priority tasks.

17. The steering system of claim 15, wherein computing the RTOS state of health value comprises:
determining a minimum value from the execution time state of health value, inter-arrival time state of health value, and blocking time state of health value of the plurality of tasks being executed by the RTOS.

18. The steering system of claim 15, wherein the execution time reference value, the inter-arrival time reference value, and the blocking time reference value are determined automatically by executing the plurality of tasks on the RTOS and monitoring the execution time, the inter-arrival time, and the blocking time of the respective tasks.

19. The steering system of claim 15, wherein the predetermined threshold is configurable.

* * * * *